United States Patent
Chang

(10) Patent No.: US 8,342,729 B2
(45) Date of Patent: Jan. 1, 2013

(54) BACKLIGHT MODULE

(75) Inventor: Liang-Kang Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 335 days.

(21) Appl. No.: 12/892,933

(22) Filed: Sep. 29, 2010

(65) Prior Publication Data

US 2011/0157914 A1 Jun. 30, 2011

(30) Foreign Application Priority Data

Dec. 25, 2009 (TW) .............................. 98224426 U

(51) Int. Cl.
*F21V 7/04* (2006.01)

(52) U.S. Cl. ........ 362/609; 362/608; 362/610; 362/612; 362/613; 362/615

(58) Field of Classification Search .................. 362/608, 362/609, 610, 612, 613, 615, 621, 623, 624, 362/625, 627, 628
See application file for complete search history.

(56) References Cited

U.S. PATENT DOCUMENTS

| | | | |
|---|---|---|---|
| 6,779,902 B2 * | 8/2004 | Cha et al. ..................... | 362/600 |
| 6,913,366 B2 | 7/2005 | Lee | |
| 7,576,805 B2 * | 8/2009 | Ito et al. ........................... | 349/15 |
| 2007/0177405 A1 | 8/2007 | Chan et al. | |
| 2011/0128255 A1 * | 6/2011 | Feng et al. .................... | 345/175 |

FOREIGN PATENT DOCUMENTS

| | | |
|---|---|---|
| TW | 589491 | 6/2004 |
| TW | M274546 | 9/2005 |
| TW | 200700797 | 1/2007 |
| TW | M316410 | 8/2007 |
| TW | M318136 | 9/2007 |
| TW | I298410 | 7/2008 |

* cited by examiner

*Primary Examiner* — Stephen F Husar
*Assistant Examiner* — James Cranson, Jr.
(74) *Attorney, Agent, or Firm* — Jianq Chyun IP Office

(57) ABSTRACT

A backlight module includes a light guide plate, a reflecting unit, two light emitting units, and two light absorbing units. The light guide plate has a first surface, a second surface opposite to the first surface, and two light incident surfaces connecting the first surface and the second surface. The two light incident surfaces are respectively located at two adjacent corners of the light guide plate. The reflecting unit is disposed on the second surface. The two light emitting units are respectively disposed beside the two light incident surfaces. Light beams emitted by the two light emitting units are capable of entering the light guide plate respectively through the two light incident surfaces and being transmitted out of the light guide plate through the first surface. The light absorbing units are disposed between the second surface and the reflecting unit and are respectively adjacent to the two light incident surfaces.

19 Claims, 9 Drawing Sheets

BACKLIGHT MODULE

CROSS-REFERENCE TO RELATED APPLICATION

This application claims the priority benefit of Taiwan application serial no. 98224426, filed on Dec. 25, 2009. The entirety of the above-mentioned patent application is hereby incorporated by reference herein and made a part of this specification.

BACKGROUND OF THE INVENTION

1. Field of Invention

The invention relates to a light source, and more particularly, to a back light module.

2. Description of Related Art

With the rapid advancement of flat display technique, the current liquid crystal displays are widely used in daily life. The liquid crystal displays have the advantages of light weight, compact size, low power consumption, and smaller thickness, so that the liquid crystal displays are progressively replacing the conventional cathode ray tubes (CRT).

The liquid crystal display has a liquid crystal panel and a backlight module, and the backlight module is configured on the back side of the liquid crystal panel for providing the planar light to the liquid crystal panel. According to the positions of the light emitting devices, the backlight modules may be classified into a direct type backlight module and a side type backlight module. The side type backlight module uses the light guide plate to guide the light emitted by the light emitting devices configured at one side of the light guide plate and to provide the planar light to the liquid crystal panel. Furthermore, according to the types of the light emitting devices, the light emitting devices could be also classified into a light emitting diode (LED) backlight module and a cold cathode fluorescent lamp (CCFL) backlight module.

In the side type backlight module using the light emitting diode as the light emitting device, a plurality of light emitting diodes which are arranged in a straight line and spaced apart from one another are configured next to the light incident surface of one side of the light guide plate. Theses light emitting diodes respectively emit a plurality of light beams and the light beams enter the light guide plate through the light incident surface of the light guide plate. Because the directivity of the light emitting diodes is higher (i.e., a limited light emitting angle range), bright regions are formed in the light guide plate within the light emitting angle range and close to the light emitting diodes, and dark regions are formed in the light guide plate outside of the light emitting angle range. The light guide plate may not be able to provide a uniform planar light source due to the existence of these bright and dark regions, and this is referred to as the "hot spot" phenomenon. It should be noticed that with the increasing of the power of each of the light emitting diodes, the number of the light emitting diodes configured at a side of the light incident surface of the light guide plate could be decreased. However, when the number of the light emitting diodes is decreased, the distance between two adjacent light emitting diodes is increased. Thus, the area of the dark region is increased and the hot spot phenomenon is getting more serious. Hence, the uniformity of the planar light source is getting worse.

Besides, FIG. 4B of Taiwan patent No. M316410 discloses a light guide plate with light sources arranged to be corresponding to one or more corners of the light guide plate. There is an indentation with the flat surface or the curve surface at the corner position. United States Patent Publication No. 20070177405 discloses a light guide plate having two light incident corners, wherein light sources are disposed at the two light incident corners. FIG. 3 of Taiwan patent No. 589491 and U.S. Pat. No. 6,913,366 disclose a light guide plate having two corner-less surfaces, wherein the first light source portion has two light emitting sources and these light emitting sources are arranged to be corresponding to the two corner-less surfaces of the light guide plate. Taiwan patent publication No. 200700797 discloses a light absorbing material which is disposed in the light path and close to the light source. The light absorbing material could be coated on or attached to one surface of the light guide plate or one surface of the optical film.

Taiwan patent No. M318136 discloses a reflecting plate having a surface with the scattering points thereon, wherein the shape of the scattering point may be a geometric figure such as a round, a rhombus, a triangle, an ellipse or a taper. The areas of the scattering points vary gradiently. The scattering points are separated from each other with a fixed distance or with a distance varying gradiently. Moreover, the scattering points are tightly arranged at the four corners of the reflecting surface.

Taiwan patent No. I298410 discloses a backlight module including a back plate and a light source. The light source is disposed at two adjacent corners of the back plate. The backlight module further includes a dissipation part, wherein the dissipation part is disposed between the light source and the back plate. Taiwan patent No. M274546 discloses a planar light source apparatus including a frame, a reflecting plate, a light guide plate, a light source, and an optical film. The frame has a plurality of hollow portions to accommodate the reflecting plate, the light guide plate, the light source, and the optical film.

SUMMARY OF THE INVENTION

The invention provides a backlight module capable of providing a more uniform planar light source.

Other objects and advantages of the invention can be further comprehended from the technical features disclosed in the invention.

In order to achieve one or a part of or all of the above objects or other objects, an embodiment of the invention provides a backlight module including a light guide plate, a reflecting unit, two light emitting units, and two light absorbing units. The light guide plate has a first surface, a second surface opposite to the first surface, and two light incident surfaces connecting the first surface and the second surface. The two light incident surfaces are respectively disposed at two adjacent corners of the light guide plate. The reflecting unit is disposed on the second surface and the two light emitting units are respectively disposed beside the two light incident surfaces. Each of the two light emitting units is capable of emitting a light beam. The light beams emitted by the two light emitting units are capable of entering the light guide plate respectively through the two light incident surfaces and being propagated out of the light guide plate through the first surface. The two light absorbing units are disposed between the second surface and the reflecting unit, wherein the two light absorbing units are respectively adjacent to the two light incident surfaces.

The embodiment of the invention may have at least one of the following advantages or effects. In the backlight module of the embodiment of the invention, since the light emitting units are disposed at the corners of the light guide plate rather than the sides of the light guide plate, and therefore the hot spot phenomenon could be effectively decreased. Thus, the backlight module could provide a more uniform planar light source. Moreover, since the light absorbing units are disposed next to the corners of the light guide plate, the regions around the corners of the light guide plate near the light sources are not over bright. Hence, the uniformity of the planar light source provided by the backlight module could be effectively increased.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
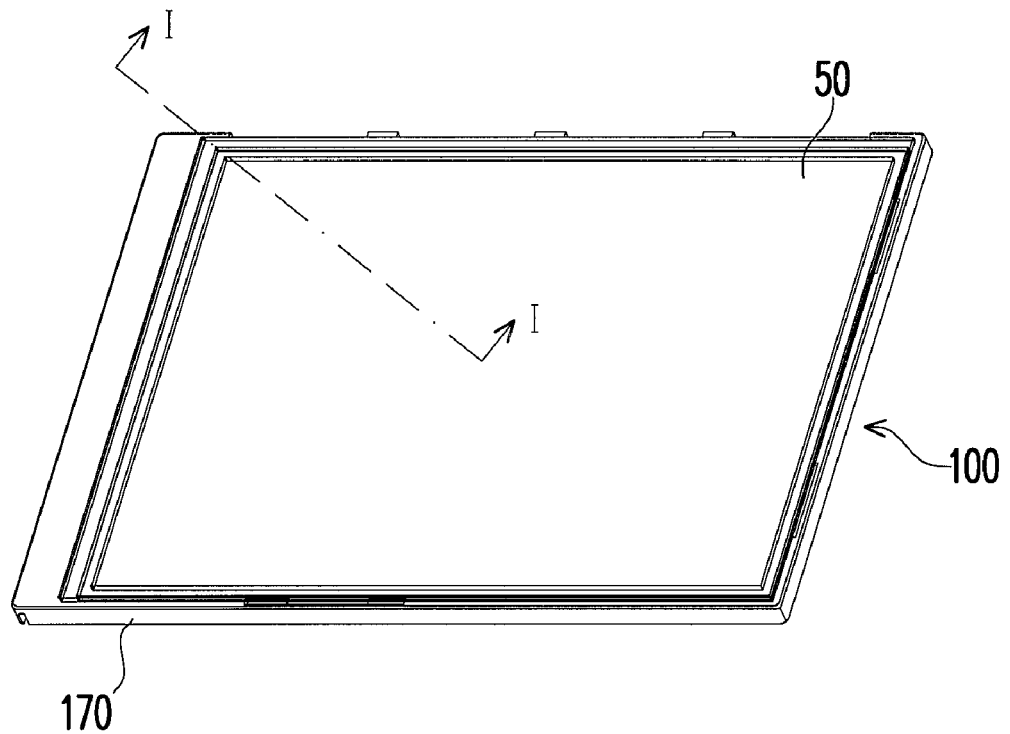
FIG. 1A is a schematic three-dimensional view of a backlight module and a display panel on the backlight module according to one embodiment of the invention.
Figure 1B:
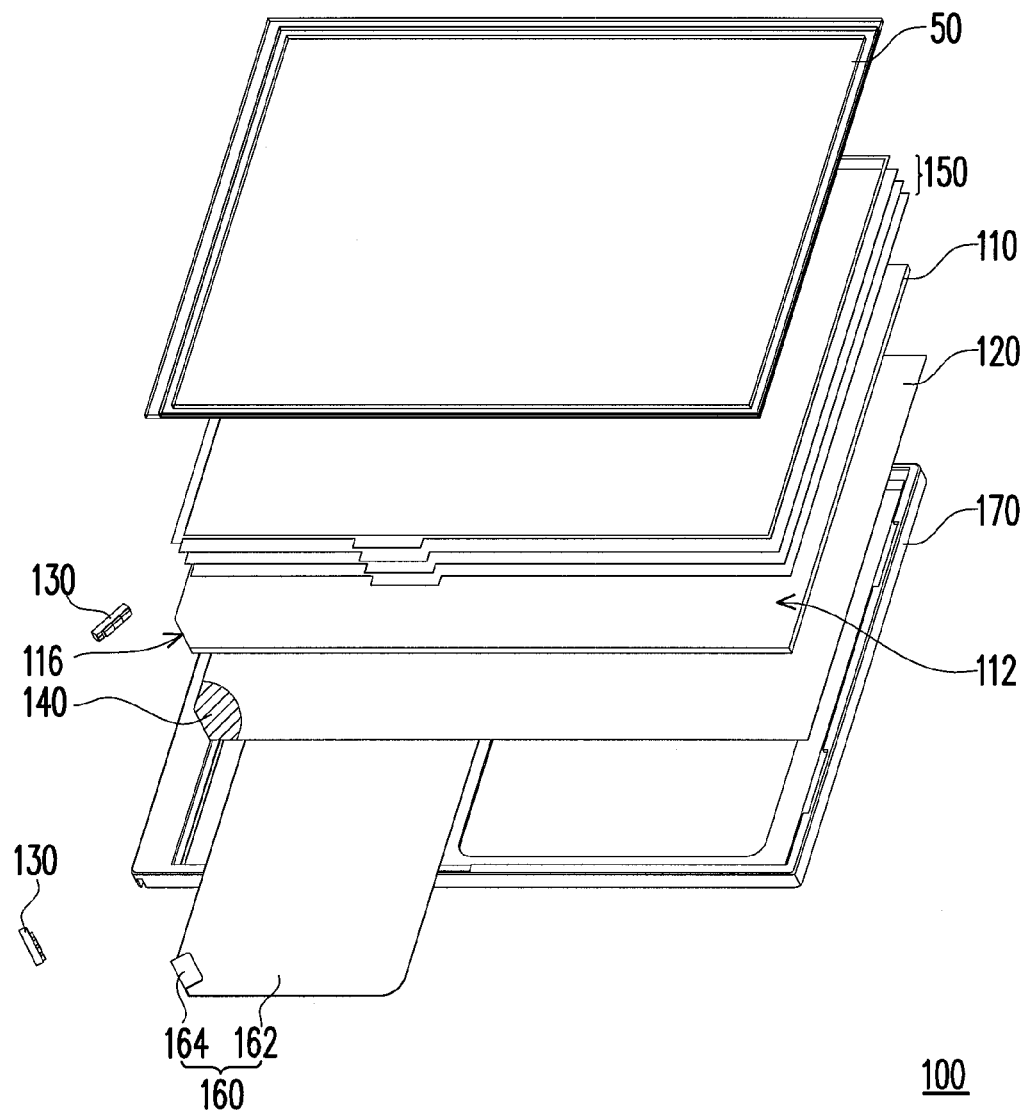
FIG. 1B is an exploded view of the backlight module of FIG. 1A.
Figure 1C:
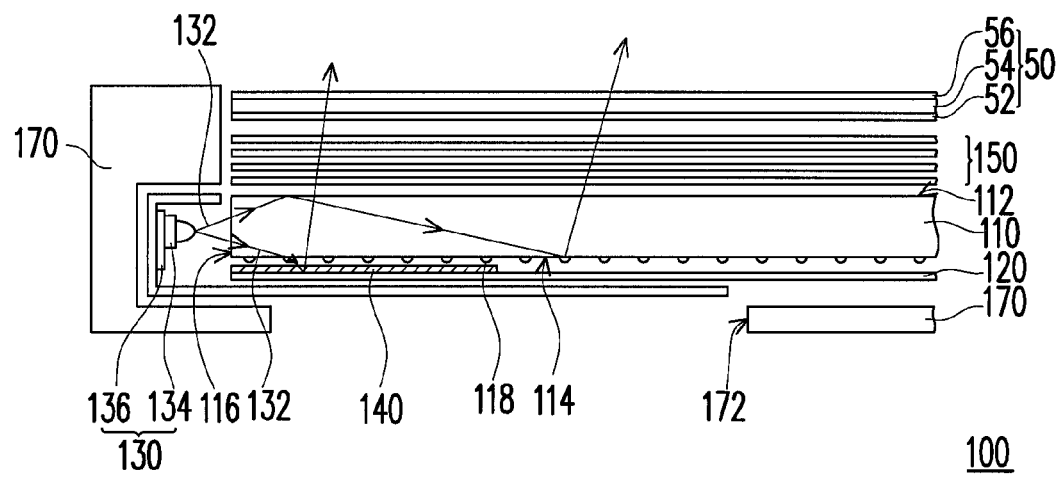
FIG. 1C is a schematic cross-sectional view illustrating the backlight module of FIG. 1A along a line I-I.
Figure 2A:
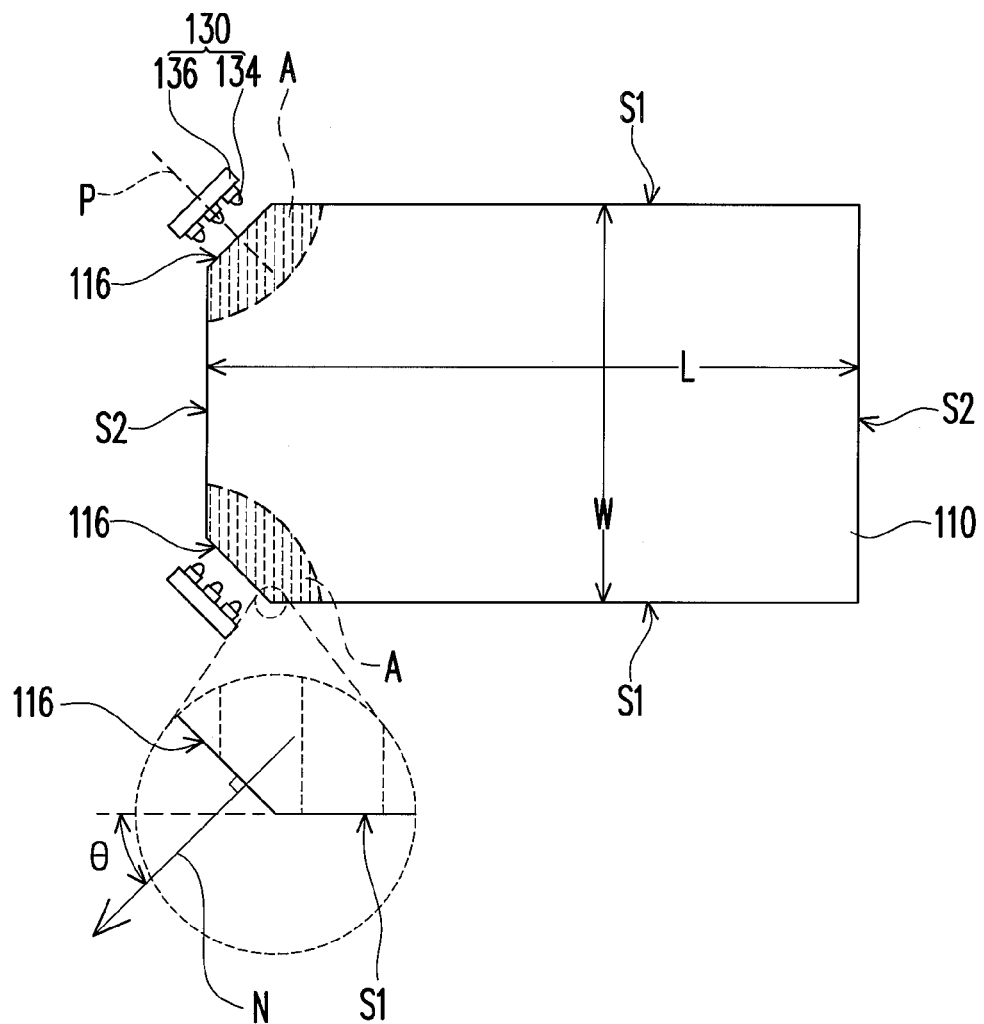
FIG. 2A is a top view of a light guide plate and light emitting units shown in FIG. 1B.
Figure 2B:
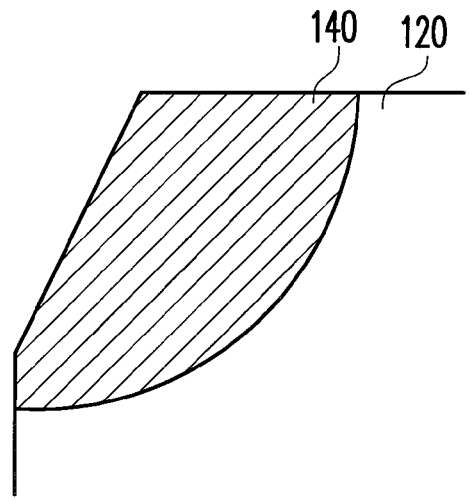
FIG. 2B is a schematic view of a corner of a reflecting unit in FIG. 1B and a light absorbing unit on the reflecting unit.
Figure 2C:
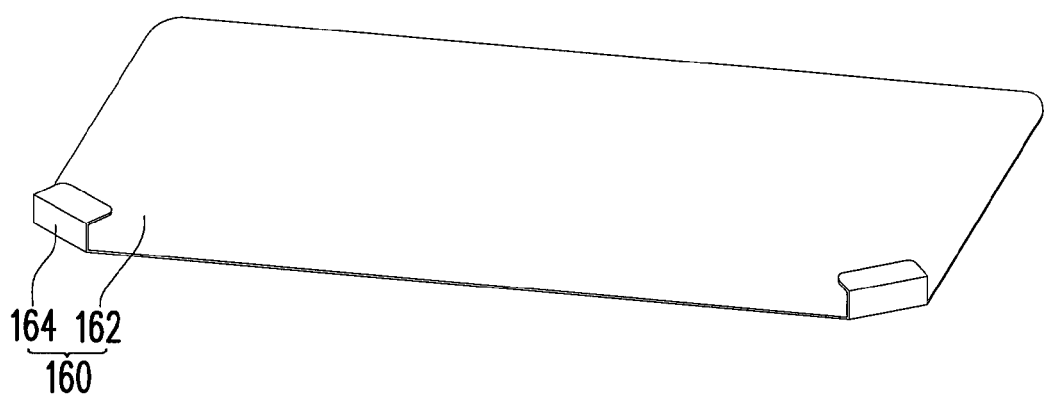
FIG. 2C is a schematic three-dimensional view of the sealant shown in FIG. 1A.

FIG. 1A is a schematic three-dimensional view of a backlight module and a display panel on the backlight module according to one embodiment of the invention. FIG. 1B is an exploded view of the backlight module of FIG. 1A. FIG. 1C is a schematic cross-sectional view illustrating the backlight module of FIG. 1A along a line I-I. FIG. 2A is a top view of a light guide plate and light emitting units shown in FIG. 1B. FIG. 2B is a schematic view of a corner of a reflecting unit in FIG. 1B and a light absorbing unit on the corner of the reflecting unit. FIG. 2C is a schematic three-dimensional view of the sealant shown in FIG. 1A. As shown in FIGS. 1A through 1C, FIG. 2A, and FIG. 2B, the backlight module 100 of the embodiment includes a light guide plate 110, a reflecting unit 120, two light emitting units 130, and two light absorbing units 140. The light guide plate 110 has a first surface 112, a second surface 114 opposite to the first surface 112, and two light incident surfaces 116 connecting the first surface 112 and the second surface 114. The two light incident surfaces 116 are respectively located at two adjacent corners of light guide plate 110, and the reflecting unit 120 is disposed on the second surface 114. In the embodiment, the reflecting unit 120 may be, for example, a reflecting plate. The two light emitting units 130 are respectively disposed beside the two light incident surfaces 116. Each of the two light emitting units 130 is capable of emitting a light beam 132. The two light beams 132 emitted by the two light emitting units 130 are capable of entering the light guide plate 110 respectively through the two light incident surfaces 116 and being propagated out of the light guide plate 110 through the first surface 112.

Specifically, in the embodiment, a plurality of scattering microstructures 118 may be formed on at least one of the first surface 112 and the second surface 114, and FIG. 1C shows the scattering microstructures 118 disposed on the second surface 114. After the light beams 132 enter the light guide plate 110 through the light incident surfaces 116, the total reflections of the light beams 132 are constantly occurring on the first surface 112 and the second surface 114. Hence, the light beams 132 are localized in the light guide plate 110. However, the scattering microstructures 118 would break the total reflections of the light beams 132. Thus, a portion of the light beams 132 is scattered to the first surface 112 and propagated out of the light guide plate 110 through the first surface 112. Moreover, the scattering microstructures 118 may also scatter another portion of the light beams 132 onto the reflecting unit 120. The reflecting unit 120 reflects the light beams 132 back to the light guide plate 110 and makes the light beams 132 transmitted through the second surface 114 and the first surface 112 in sequence. Therefore, a planar light source may be formed on the first surface 112.

The two light absorbing units 140 are disposed between the second surface 114 and the reflecting unit 120, wherein the two light absorbing units 140 are respectively adjacent to the two light incident surfaces 116. In FIG. 2A, regions A correspond to the location of the light absorbing units 140 shown in FIG. 2B. Hence, the light absorbing units 140 may absorb at least a portion of the light beams 132 with over high brightness and near the light incident surface 116 of the light guide plate 110. Thus, the uniformity of the planar light source is effectively increased. Moreover, since the light emitting units 130 are disposed at two corners of the light guide plate 110, the backlight module 100 of the embodiment may effectively decrease the hot spot phenomenon, so to increase the uniformity of the planar light source.

In the embodiment, each of the two light emitting units 130 includes a carrier 136 and a plurality of light emitting elements 134 disposed on the carrier 136. Each of the light emitting elements 134 may be, for example, a light emitting diode (LED). The carrier 136 may be, for example, a circuit board. In the embodiment, the locations of the light emitting elements 134 on the light emitting unit 130 are in mirror symmetry with respect to a central vertical surface P of the light incident surface 116, wherein the central vertical surface P is perpendicular to the first surface 112. Therefore, the uniformity of the planar light source may be greatly improved. Specifically, in the embodiment, a light emitting element 134 is disposed on the central vertical surface P and the locations of the light emitting elements 134 disposed at both sides of the central vertical surface P are mirror symmetrical with respect to the central vertical surface P. However, the invention is not limited to the above description.

In the embodiment, an optical film set 150 may be disposed on the first surface 112 of the light guide plate 110 and the optical film set 150 includes a diffusion film, a prism sheet, a brightness enhancement film (BEF), other suitable optical films or the combination thereof. The optical film set 150 may enhance the optical features of the planar light source, such as the brightness of the planar light source, the uniformity of the planar light source or the combination thereof.

In the embodiment, a display panel 50 may be disposed on the optical film set 150. The display panel 50 may be, for example, a liquid crystal panel. Specifically, the display panel 50 may include an active device array substrate 52, a liquid crystal layer 54 and an opposed substrate 56,wherein the liquid crystal layer 54 is disposed between the active device array substrate 52 and the opposed substrate 56. In the embodiment, the active device array substrate 52 may be, for example, a thin film transistor array substrate (TFT array substrate), and the opposed substrate 56 may be, for example, a color filter substrate. After the light beam 132 from the light guide plate 110 passing through the display panel 50, an image composed of the light beam 132 may be perceived by the viewer. Since the backlight module 100 of the embodiment provides a uniform planar light source, the displaying quality (such as brightness and uniformity) of the displayed image may be effectively improved.

In the embodiment, each of the light absorbing units 140 may be, for example, a light absorbing material coated on the reflecting unit 120. In the embodiment, a light absorption rate of the light absorbing material is gradually decreased from a portion near each of the two light incident surfaces 116 (i.e. the portion of the two light incident surfaces 116 near the two light absorbing units 140) to a portion away from each of the two light incident surfaces 116. Since the intensity of the light beam 132 is getting enhanced as it is getting closer to the light incident surface 116, the aforementioned arrangement that the light absorption rate of the light absorbing material is gradually decreased from the portion near each of the two light incident surfaces 116 to the portion away from each of the two light incident surfaces 116 may maintain the uniformity of the intensity of the planar light source near the light incident surfaces 116. The method for gradually decreasing the light absorption rate of the light absorbing material could be implemented by gradually decreasing the concentration of the light absorbing component or by gradually decreasing the thickness of the light absorbing material. In the embodiment, the average light absorption rate of each of the two light absorbing units 140 is larger than or equal to 50% and smaller than or equal to 80%. Further, the definition of the average light absorption rate is that the value of the sum of the light absorption rate of every location on the light absorbing unit 140 being divided by the sum of the areas of the light absorbing units 140. Therefore, the uniformity of the planar light source is better. More particularly, the average light absorption rate of the light absorbing units is not limited to the aforementioned rage which is larger than or equal to 50% and smaller than or equal to 80%. That is, in other embodiments, the average light absorption rate may be in different ranges according to the practical requirements.

In the embodiment, the light guide plate 110 has two long sides S1 opposite to each other and two short sides S2 opposite to each other, and the two light incident surfaces 116 are respectively disposed at two ends of one of the two short sides S2. In the embodiment, an angle between a normal vector N of each of the light incident surfaces 116 and the corresponding long side S1 of the light guide plate 110 is $\theta$, and a width of the light guide plate 110 along a direction parallel to the two long sides S1 of the light guide plate is L, and a width of the light guide plate 110 along a direction parallel to the two short sides S2 of the light guide plate is W. Hence, the light guide plate 110 complies with a requirement that $20°<\theta\text{-tan}^{-1}(W/L)<70°$ and the angles $\theta$ between the normal vectors N of the two light incident surfaces 116 and the long sides S1 of the light guide plate 110 may be equal to or different from each other. Since the angle $\theta$ of the normal vector N of the light incident surface 116 is designed according to the width L and width W of the light guide plate 110, the uniformity of the planar light source may be improved to a relatively better condition. In the embodiment, when $\theta\text{-tan}^{-1}(W/L)=0$, the angles $\theta$ between the normal vectors N of the two light incident surfaces 116 and the long sides S1 of the light guide plate 110 are equal to each other. Hence, the uniformity of the planar light source may be improved to a relatively better condition. Moreover, in one embodiment, the angle is larger than or equal to 30 degrees and smaller than or equal to 45 degrees. In one embodiment, the two angles θ are different from each other. For instance, one angle θ is 30 degree and the other angle θ is 35 degree.

Referring to FIG. 1B, FIG. 1C and FIG. 2C again, in this embodiment, the backlight module 100 further includes a heat dissipation frame 160. The heat dissipation frame 160 includes a flat plate portion 162 and two lampshade portions 164 connected to the flat plate portion 162. The reflecting unit 120 is disposed between the flat plate portion 162 and the second surface 114, and the two light emitting units 130 are respectively disposed in the two lampshade portions 164. In the embodiment, the light emitting units 130 are disposed in the lampshade portions 164. Hence, the heat generated by the light emitting units 130 may be transmitted to the external environment through the lampshade portions 164 and the flat plate portion 162. Thus, the efficiency of heat dissipation may be improved. Moreover, the heat dissipation frame 160 is also capable of fixing the light guide plate 110 so as to improve the reliability of the backlight module 100. Also, in the embodiment, the backlight module 100 further includes a sealant 170 for enclosing the light guide plate 110, the reflecting unit 120, and the light emitting units 130. In the embodiment, the sealant 170 also encloses the lampshade portions 164 and the sealant 170 has a hollow portion 172 for exposing the flat plate portion 162. Hence, the efficiency of heat dissipation of the flat plate portion 162 may be improved.

Figure 3:
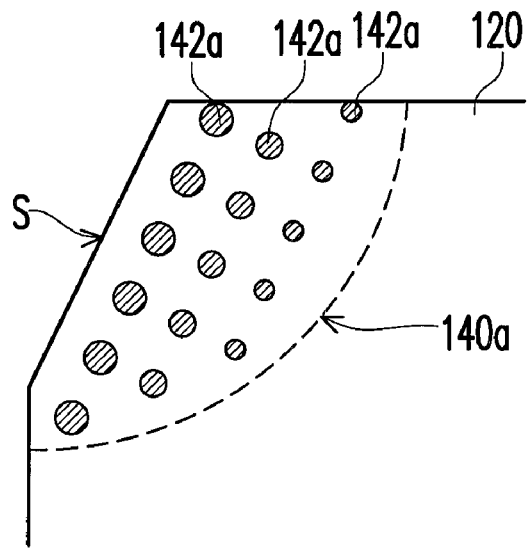
FIG. 3 is a schematic view showing a corner of a reflecting unit of a backlight module and a light absorbing unit on the corner according to another embodiment of the invention.

FIG. 3 is a schematic view showing a corner of a reflecting unit of a backlight module and a light absorbing unit on the corner according to another embodiment of the invention. Referring to FIG. 3, the backlight module of the embodiment is similar to the backlight module of FIG. 1B, and the difference between these two backlight modules is the light absorbing unit. In the embodiment, each of the light absorbing units 140a is a patterned light absorbing unit and an area occupied by the light absorbing unit 140a in a unit area of the reflecting unit 120 is gradually decreased from a portion near each of the two light incident surfaces 116 (i.e. the portion near the lateral side S of the reflecting unit 120 as shown in FIG. 2A) to a portion away from each of the two light incident surfaces 116. Thus, as shown in FIG. 2A, the planar light source around the corners of the light guide plate 110 may be maintained at a condition with a relatively better uniformity. In the embodiment, each of the light absorbing units 140a includes a plurality of light absorbing patterns 142a separated from one another. Areas of the light absorbing patterns 142a are gradually decreased from the portion near each of the two light incident surfaces 116 to the portion away from each of the two light incident surfaces 116.

Figure 4:
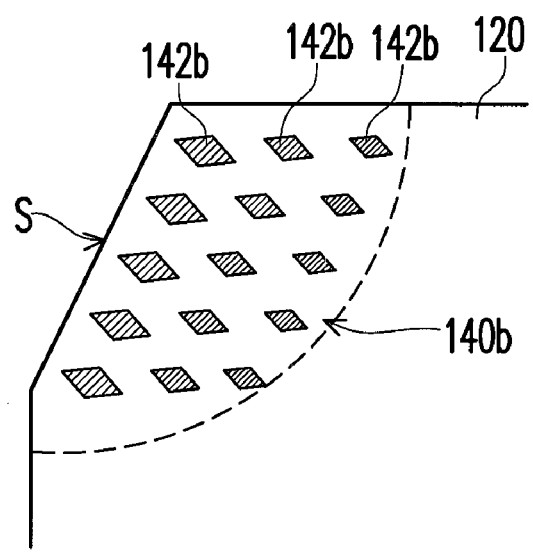
FIG. 4 is a schematic view showing a corner of a reflecting unit of a backlight module and a light absorbing unit on the corner according to another embodiment of the invention.

FIG. 4 is a schematic view showing a corner of a reflecting unit of a backlight module and a light absorbing unit on the corner according to another embodiment of the invention. Referring to FIG. 4, the light absorbing units 140b of the present embodiment are similar to the light absorbing units 140a of FIG. 3, and the difference between them is the shape of the light absorbing pattern. In FIG. 3, each of the light absorbing patterns 142a is, for example, round, and each of the light absorbing patterns 142b in the present embodiment is, for example, polygonal. For instance, as shown in FIG. 4, each of the light absorbing patterns 142b is quadrilateral.

Figure 5:
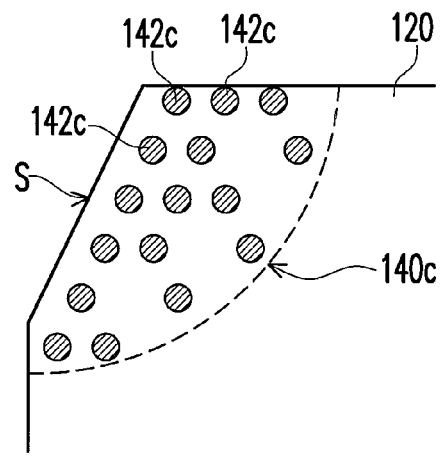
FIG. 5 is a schematic view showing a corner of a reflecting unit of a backlight module and a light absorbing unit on the corner according to another embodiment of the invention.

FIG. 5 is a schematic view showing a corner of a reflecting unit of a backlight module and a light absorbing unit on the corner according to another embodiment of the invention. Referring to FIG. 5, the light absorbing units 140c of the embodiment are similar to the light absorbing units 140a of FIG. 3, and the difference between these two light absorbing units is described as below. In the embodiment, areas of the light absorbing patterns 142c are substantially equal to one another. However, a number density of the light absorbing patterns 142c is gradually decreased from the portion near each of the two light incident surfaces 116 (as shown in FIG. 2A) to the portion away from each of the two light incident surfaces 116.

Figures 6A, 6B:
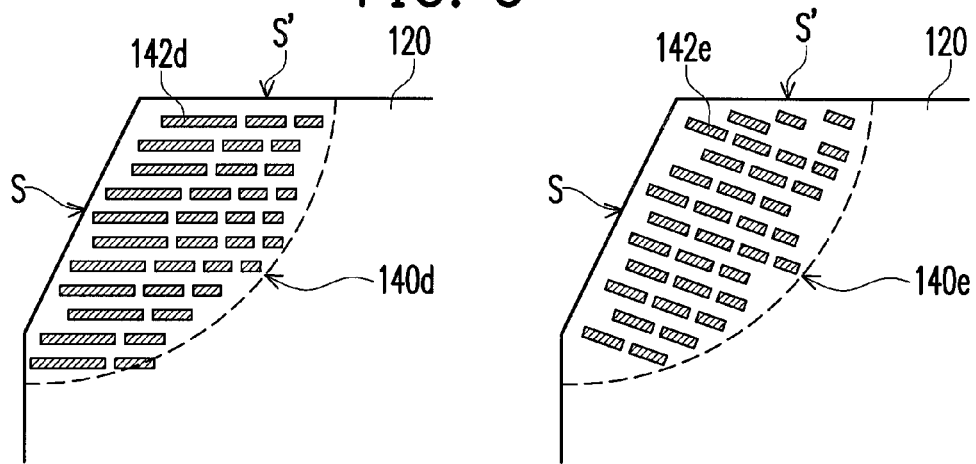
FIG. 6A is a schematic view showing a corner of a reflecting unit of a backlight module and a light absorbing unit on the corner according to another embodiment of the invention.
FIG. 6B is a schematic view showing a corner of a reflecting unit of a backlight module and a light absorbing unit on the corner according to another embodiment of the invention.

FIG. 6A is a schematic view showing a corner of a reflecting unit of a backlight module and a light absorbing unit on the corner according to another embodiment of the invention. Referring to FIG. 6A, the light absorbing units 140d of the embodiment are similar to the light absorbing units 140b of FIG. 4, and the difference between them is described as below. In the embodiment, each of the light absorbing patterns 142d is strip-shaped and the length of the light absorbing patterns 142d along the extending direction thereof is gradually decreased from the portion near each of the two light incident surfaces 116 (as shown in FIG. 2A) to the portion away from each of the two light incident surfaces 116.

FIG. 6B is a schematic view showing a corner of a reflecting unit of a backlight module and a light absorbing unit on the corner according to another embodiment of the invention. Referring to FIG. 6B, the light absorbing units 140e of the present embodiment are similar to the light absorbing units 140d of FIG. 6A, and the difference between them is the extending direction of each of light absorbing patterns. In FIG. 6A, the extending direction of each of the light absorbing patterns 142d is substantially parallel to the lateral side S' of the reflecting unit 120. However, in the embodiment, the extending direction of each of the light absorbing patterns 142e is substantially perpendicular to the lateral side S.

It should be noticed that the invention does not limit the size, the extending direction and the shape of each of the light absorbing patterns. In other embodiments, the size, the extending direction and the shape of each of the light absorbing patterns may be altered.

Figure 7:
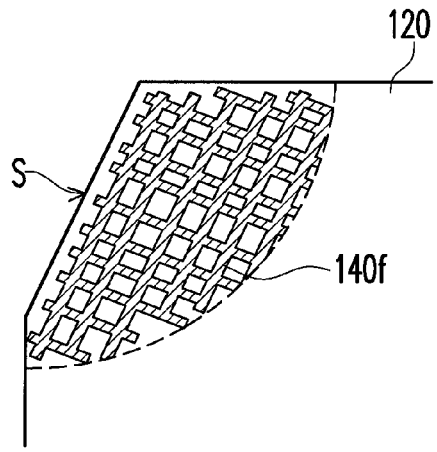
FIG. 7 is a schematic view showing a corner of a reflecting unit of a backlight module and a light absorbing unit on the corner according to another embodiment of the invention.

FIG. 7 is a schematic view showing a corner of a reflecting unit of a backlight module and a light absorbing unit on the corner according to another embodiment of the invention. Referring to FIG. 7, the light absorbing units 140f of the embodiment are similar to the light absorbing units 140 of FIG. 2B, and the difference between them is that the light absorbing units 140f are the patterned light absorbing units. In the embodiment, each of the light absorbing units 140f is network-shaped. However, in other embodiments, the light absorbing units may be other contiguous patterns or discontinuous patterns. Moreover, the light absorbing units 140f and the light absorbing units 140 shown in FIG. 2B are similar to each other in that the each of light absorbing units 140f is also a light absorbing material coated on the reflecting unit. Further, a light absorption rate of the light absorbing material is gradually decreased from a portion near each of the two light incident surfaces 116 (as shown in FIG. 2A) to a portion away from each of the two light incident surfaces 116. That is, the method for gradually decreasing the light absorption rate of the light absorbing material may be implemented by gradually decreasing the concentration of the light absorbing component or by gradually decreasing the thickness of the light absorbing material as described in the embodiment of FIG. 2A.

Figure 8:
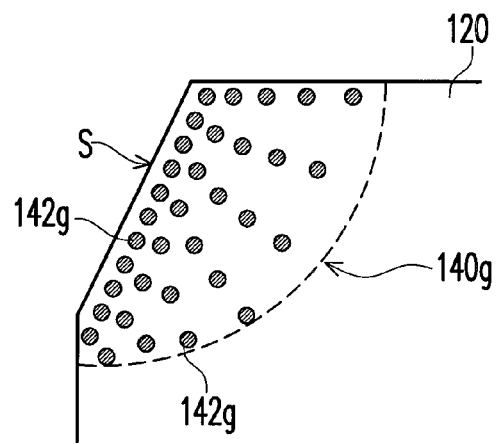
FIG. 8 is a schematic view showing a corner of a reflecting unit of a backlight module and a light absorbing unit on the corner according to another embodiment of the invention.

FIG. 8 is a schematic view showing a corner of a reflecting unit of a backlight module and a light absorbing unit on the corner according to another embodiment of the invention. Referring to FIG. 8, the light absorbing units 140g of the present embodiment are similar to the light absorbing units 140c of FIG. 5. Distances respectively between the plurality of light absorbing patterns 142g of light absorbing units 140g of the embodiment are gradually increased from the portion near each of the two light incident surfaces 116 (as shown in FIG. 2A) to the portion away from each of the two light incident surfaces 116.

Figure 9:
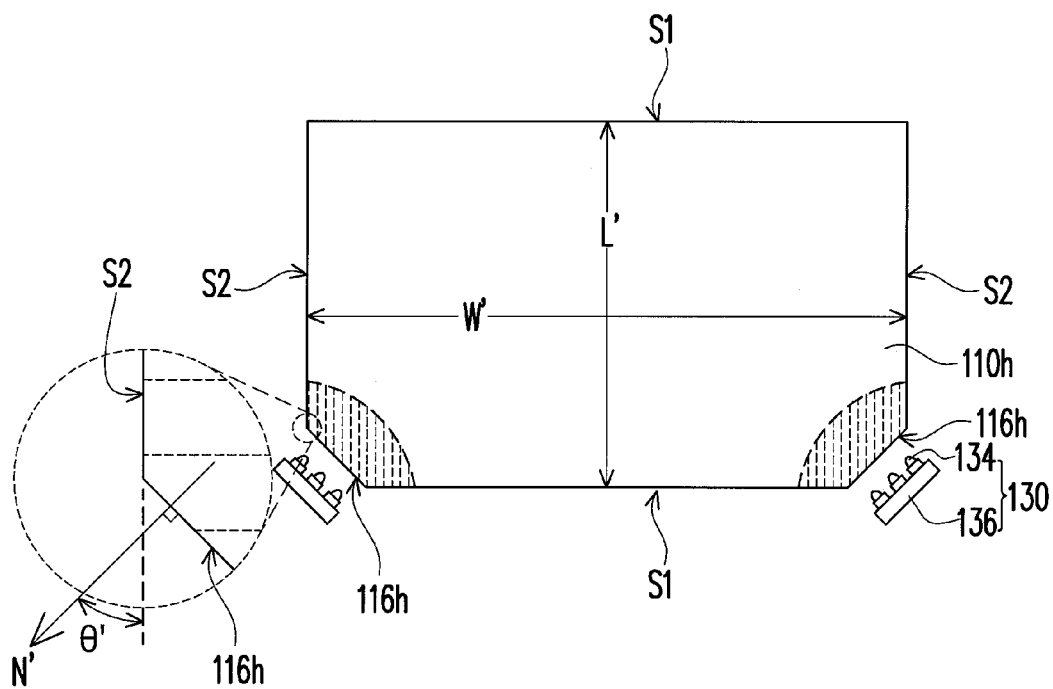
FIG. 9 is a schematic top view of a light guide plate of a backlight module and light emitting units according to another embodiment of the invention.

FIG. 9 is a schematic top view of a light guide plate of a backlight module and two light emitting units according to another embodiment of the invention. Referring to FIG. 9, the backlight module of the embodiment is similar to the backlight module 100 of FIG. 1B and FIG. 2A, and the difference between them is the locations of the light incident surfaces of light guide plates. In the embodiment, the two light incident surfaces 116h are respectively disposed at two ends of one of the two long sides S1 of the light guide plate 110h. Furthermore, in the embodiment, an angle between a normal vector N' of the light incident surface 116h and the corresponding short side S2 of the light guide plate 110h is θ', a width of the light guide plate 110h along a direction parallel to the two long sides S1 of the light guide plate 110h is W', and a width of the light guide plate 110h along a direction parallel to the two short sides S2 of the light guide plate 110h is L'. Hence, the light guide plate complies with a requirement that $20°<θ-\tan^{-1}(W/L)<70°$ and the angles θ' respectively between the normal vectors N' of the two light incident surfaces 116 and the short sides S2 of the light guide plate 110h may be equal to or different from each other. Accordingly, the uniformity of the planar light source may be improved. In one embodiment, when $θ'-\tan^{-1}(W'/L')=0$, the angles θ' respectively between the normal vectors N' of the two light incident surfaces 116h and the short sides S2 of the light guide plate 110 are equal to each other. In another embodiment of the invention, the angle θ' is larger than or equal to 45 degrees and smaller than or equal to 60 degrees. Further, in other embodiments of the invention, the angle θ' is larger than or equal to 45 degrees and smaller than or equal to 60 degrees and the two angles θ' respectively between the normal vectors N' of the two light incident surfaces 116h and the short sides S2 of the light guide plate 110 are different from each other. For instance, one angle between the normal vector of one light incident surface and the short side is 45 degrees, and the other angle between the normal vector of the other light incident surface and the short side is 55 degrees.

Figure 10:
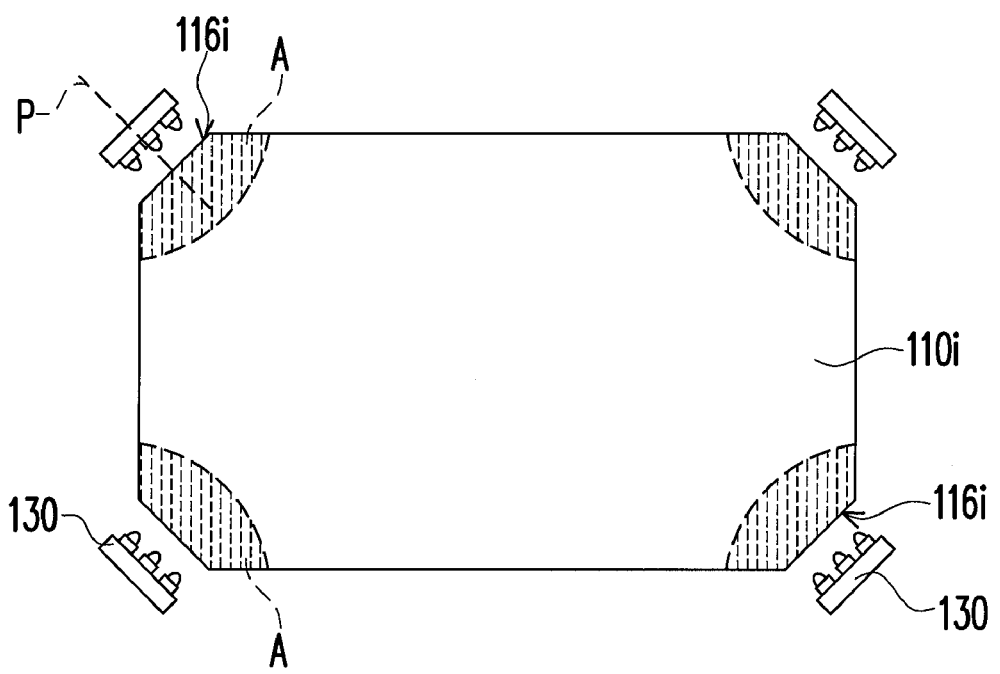
FIG. 10 is a schematic top view of a light guide plate of a backlight module and light emitting units according to another embodiment of the invention.

FIG. 10 is a schematic top view of a light guide plate of a backlight module and light emitting units according to another embodiment of the invention. Referring to FIG. 10, the backlight module of the embodiment is similar to the backlight module 100 of FIG. 1B and FIG. 2A, and the difference between them is the number of the light incident surfaces of the light guide plate. In the embodiment, the light guide plate 110i has four light incident surfaces 116i respectively located at four corners of the light guide plate 110i. Light emitting units 130 are disposed next to the light incident surfaces 116i respectively. Moreover, the four light incident surfaces 116i respectively correspond to four light absorbing units, and the four regions A shown in FIG. 10 respectively correspond to the four light absorbing units.

It should be noticed that the invention is not limited to the number of the light incident surfaces, the number of the light absorbing units and the number of the light emitting units. In other embodiments, the number of the light incident surfaces, the number of the light absorbing units and the number of the light emitting units in the backlight module may be also adjusted by requirements.

Altogether, the embodiments of the invention may have at least one of the following advantages or effects. In the backlight module of the embodiment of the invention, since the two light emitting units are respectively disposed at the corners of the light guide plate rather than the sides of the light guide plate, the hot spot phenomenon may be effectively decreased and the backlight module may provide a more uniform planar light source. Moreover, since the light absorbing units are disposed next to the corners of the light guide plate, the regions around the corners of the light guide plate near the light sources are not over bright. Hence, the uniformity of the planar light source provided by the backlight module may be effectively increased.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
   a light guide plate having a first surface, a second surface opposite to the first surface, and two light incident surfaces connecting the first surface and the second surface, wherein the two light incident surfaces are respectively located at two adjacent corners of the light guide plate;
   a reflecting unit disposed on the second surface;
   two light emitting units respectively disposed beside the two light incident surfaces, wherein each of the two light emitting units is capable of emitting a light beam, and the light beams emitted by the two light emitting units are capable of entering the light guide plate respectively through the two light incident surfaces and being propagated out of the light guide plate through the first surface; and
   two light absorbing units disposed between the second surface and the reflecting unit, wherein the two light absorbing units are respectively adjacent to the two light incident surfaces.

2. The backlight module of claim 1, wherein each of the two light absorbing units is a light absorbing material coated on the reflecting unit.

3. The backlight module of claim 2, wherein a light absorption rate of the light absorbing material is gradually decreased from a portion near each of the two light incident surfaces to a portion away from each of the two light incident surfaces.

4. The backlight module of claim 1, wherein each of the light absorbing units is a patterned light absorbing unit, and an area occupied by the patterned light absorbing unit in a unit area of the reflecting unit is gradually decreased from a portion near each of the two light incident surfaces to a portion away from each of the two light incident surfaces.

5. The backlight module of claim 4, wherein each of the patterned light absorbing units is a light absorbing material coated on the reflecting unit.

6. The backlight module of claim 5, wherein a light absorption rate of the light absorbing material is gradually decreased from the portion near each of the two light incident surfaces to the portion away from each of the two light incident surfaces.

7. The backlight module of claim 4, wherein each of the pattered absorbing units comprises a plurality of light absorbing patterns separated from one another, and areas of the light absorbing patterns are gradually decreased from the portion near each of the two light incident surfaces to the portion away from each of the two light incident surfaces.

8. The backlight module of claim 4, wherein each of the pattered absorbing units comprises a plurality of light absorbing patterns separated from one another, and distances between the light absorbing patterns are gradually increased from the portion near each of the two light incident surfaces to the portion away from each of the two light incident surfaces.

9. The backlight module of claim 4, wherein each of the pattered absorbing units comprises a plurality of light absorbing patterns separated from one another, and a number density of the light absorbing patterns is gradually decreased from the portion near each of the two light incident surfaces to the portion away from each of the two light incident surfaces.

10. The backlight module of claim 4, wherein each of the patterned light absorbing units is network-shaped.

11. The backlight module of claim 1, wherein the light guide plate has two long sides opposite to each other and two short sides opposite to each other, and the two light incident surfaces are respectively disposed at two ends of one of the two long sides.

12. The backlight module of claim 11, wherein an angle between a normal vector of each of the two light incident surfaces and the corresponding short side of the light guide plate is $\theta$, and a width of the light guide plate along a direction parallel to the two long sides of the light guide plate is W, and a width of the light guide plate along a direction parallel to the two short sides of the light guide plate is L, and the light guide plate complies with a requirement that $20°<\theta\text{-}\tan^{-1}(W/L)<70°$.

13. The backlight module of claim 11, wherein an angle between a normal vector of each of the two light incident surfaces and the corresponding short side of the light guide plate is $\theta$, and $\theta$ is larger than or equal to 45 degrees and smaller than or equal to 60 degrees.

14. The backlight module of claim 1, wherein the light guide plate has two long sides opposite to each other and two short sides opposite to each other, and the two light incident surfaces are respectively disposed at two ends of one of the two short sides.

15. The backlight module of claim 14, wherein an angle between a normal vector of each of the two light incident surfaces and the corresponding long side of the light guide plate is $\theta$, and a width of the light guide plate along a direction parallel to the two long sides of the light guide plate is L, and a width of the light guide plate along a direction parallel to the two short sides of the light guide plate is W, and the light guide plate complies with a requirement that $20°<\theta\text{-}\tan^{-1}(W/L)<70°$.

16. The backlight module of claim 14, wherein an angle between a normal vector of each of the two light incident surfaces and the corresponding long side of the light guide plate is $\theta$, and $\theta$ is larger than or equal to 30 degrees and smaller than or equal to 45 degrees.

17. The backlight module of claim 1, further comprising a heat dissipation frame, wherein the heat dissipation frame comprises a flat plate portion and two lampshade portions connected to the flat plate portion, and the reflecting unit is disposed between the flat plate portion and the second surface, and the two light emitting units are respectively disposed in the two lampshade portions.

18. The backlight module as claimed in claim 1, further comprising a sealant enclosing the light guide plate, the reflecting unit, and the two light emitting units.

19. The backlight module of claim 1, wherein an average light absorption rate of each of the two light absorbing units is larger than or equal to 50% and smaller than or equal to 80%.

* * * * *